Dec. 30, 1924.   1,521,569
W. L. THAETE ET AL
HEADLIGHT TILTING DEVICE
Filed June 7, 1924   2 Sheets-Sheet 1
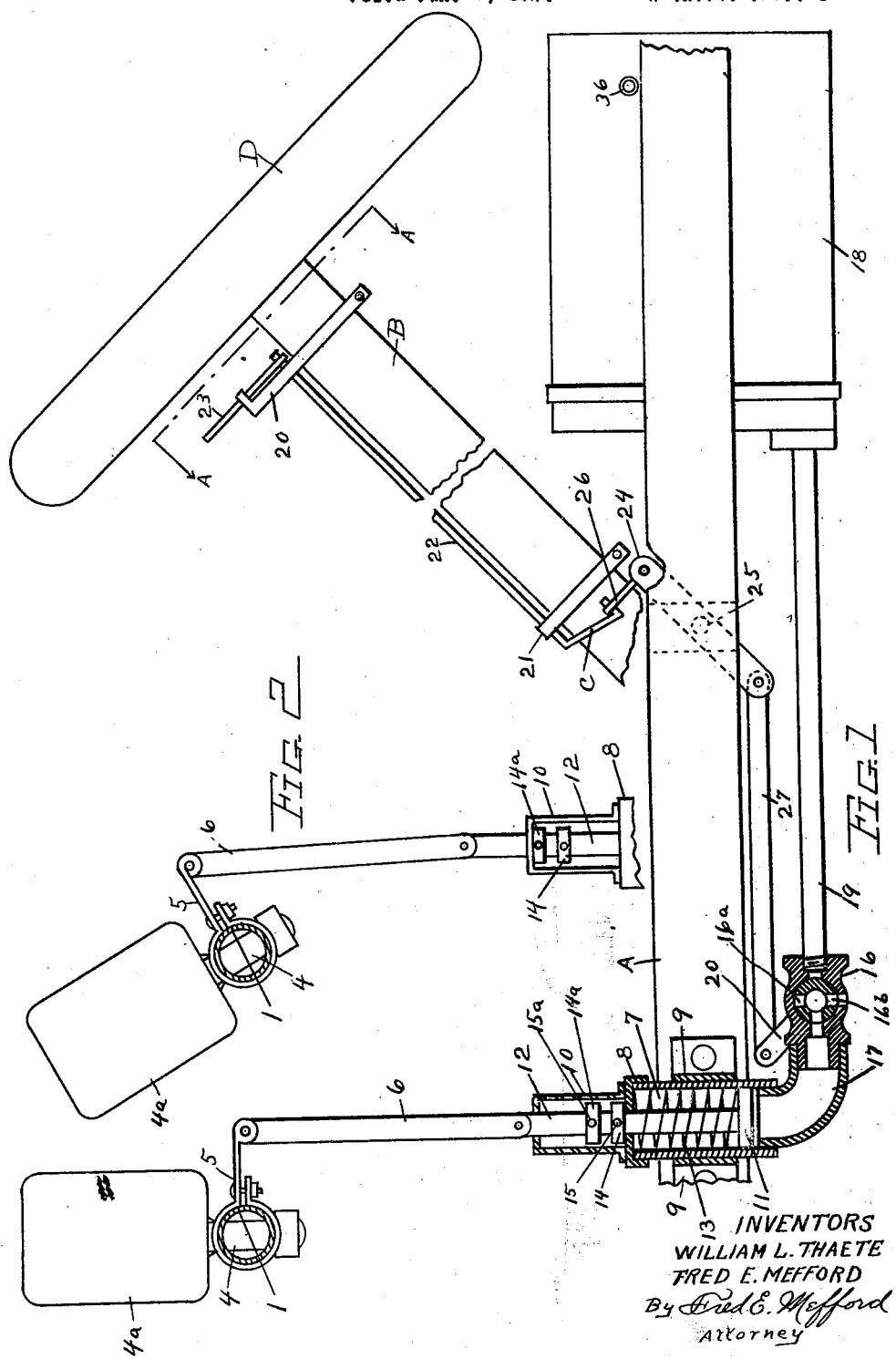
INVENTORS
WILLIAM L. THAETE
FRED E. MEFFORD
By Fred E. Mefford
Attorney Dec. 30, 1924.                                                           1,521,569
                        W. L. THAETE ET AL
                       HEADLIGHT TILTING DEVICE
                    Filed June 7, 1924          2 Sheets-Sheet 2
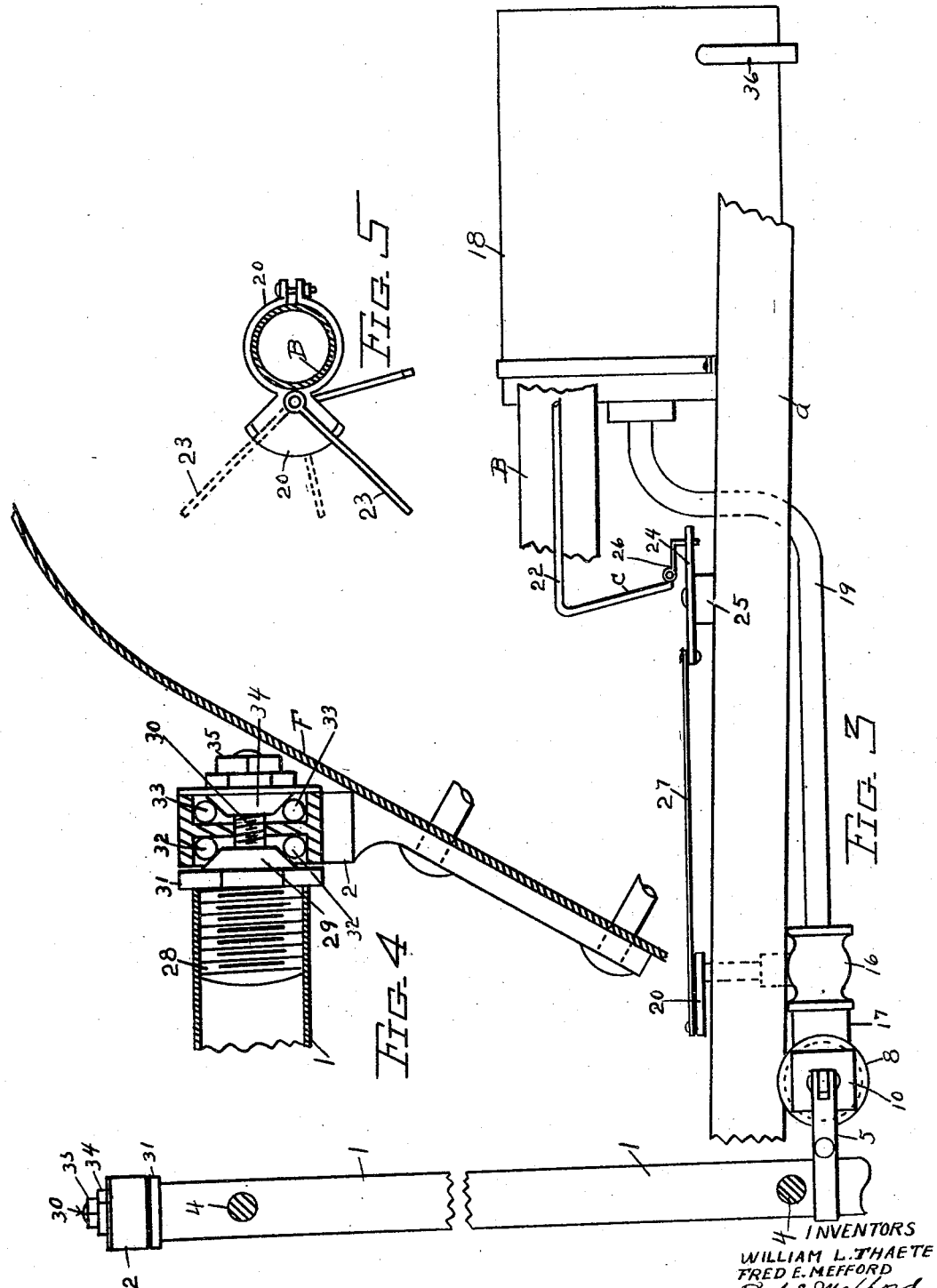
INVENTORS
WILLIAM L. THAETE
FRED E. MEFFORD
By Fred E. Mefford
Attorney Patented Dec. 30, 1924.

1,521,569

UNITED STATES PATENT OFFICE.

WILLIAM L. THAETE AND FRED E. MEFFORD, OF COLORADO SPRINGS, COLORADO.

HEADLIGHT-TILTING DEVICE.

Application filed June 7, 1924. Serial No. 718,502.

*To all whom it may concern:*

Be it known that we, WILLIAM L. THAETE and FRED E. MEFFORD, citizens of the United States, and residents of Colorado Springs, in the county of El Paso and State of Colorado, have invented a new and useful Headlight-Tilting Device, of which the following is a specification.

The invention relates to tilting mechanisms for automobile headlights and the object is the provision of a device of this class which may be operated by compressed air and controlled from the steering wheel column of the automobile. Other objects will appear as the description progresses.

Although the preferred form of the invention is shown and described it is to be understood that within the scope of what is hereinafter claimed, various details of construction may be made to adapt it to different makes of automobiles.

The drawings are for illustrative purposes only, and are largely schematic and are therefore not drawn to scale.

Figure 1 represents a side elevation, partly in section, of the invention attached to a side bar and steering wheel column of an automobile; Fig. 2, a fragmentary side elevation showing the headlight tilted; Fig. 3, a plan view of Fig. 1; Fig. 4, an enlarged sectional elevation showing the manner of mounting the tube and bracket, and Fig. 5, a section on the line A—A in Fig. 1, showing the parts mounted on the steering wheel column.

The reference character A denotes the side bar of an automobile, B the steering wheel column, and D the steering wheel.

The invention comprises a transversely disposed tube 1 mounted in brackets 2, said brackets being adapted to be mounted on the front fender F as shown in Fig. 4; standards 4 mounted on tube 1; an arm 5 adjustably mounted on tube 1; a cylnder 7 having a cap 8, mounted on a side bar A by loop 9; a yoke 10 mounted on cap 8; a piston 11, having a piston rod 12, disposed in cylinder 7; a link 6 connecting arm 5 and piston rod 12; a spring 13 disposed around piston rod 12 within cylinder 7; a collar 14 mounted on piston rod 12 and held by set screw 15; a collar 14$^a$ mounted on piston rod 12 and held by set screw 15$^a$; a three way cock 16 connected to cylinder 7 by an L 17; an air reservoir 18, connected to cock 16 by pipe 19; a quadrant 20 and a bracket 21 mounted on the steering wheel column B; a rod 22, having a lever 23, mounted in said quadrant 20 and bracket 21; a main lever 24 mounted on a stud 25 secured to side bar A; a link 26 connecting lever 24 and arm C of rod 22; a bar 27 connecting main lever 24 and operating lever 28 of cock 16.

Assuming that air reservoir 18 contains air under pressure, the device is operated as follows: Lever 23 is pulled to the right thereby turning rod 22 which lifts link 26 and the upper arm of lever 24. This movement pulls bar 27 and swings lever 28, which brings ports 16$^a$ and 16$^b$ to the position that permits a flow of compressed air from pipe 19 to L 17. The pressure of said air forces piston 11 upward until collar 14$^a$ strikes yoke 10. This movement tilts the headlights 4$^a$ as shown in Fig. 2.

To return the headlights to normal, lever 23 is thrown back, which brings the ports in cock 16 to the positions shown in Fig. 1 and shuts off the air from pipe 19 and allows the air in cylinder 7 to escape. The pressure of spring 13 forces the piston 11 down and returns the headlights to normal, as shown in Fig. 1.

Threaded plugs 28, having cone shoulders 29 and threaded extensions 30 integral therewith, are screwed into tube 1 and locked therein by lock nuts 31. Each bracket 2 is provided with an inner and an outer ball race having balls 32 and 33 therein, respectively. Cone shoulder 29 is disposed against balls 32 and cone 34 screwed on threaded extension 30 and locked by lock nut 35. These bearings permit tube 1 to be held snugly without rattling and to turn easily.

Air reservoir 18 may be filled from the regular air supply at filling stations or from a pump, the inlet value being in valve stem 36.

The cock 16 and L 17 may be disconnected and a hydraulic operating means connected to L 17.

Claims:

1. In a device of the class described the combination of a vertically disposed cylinder adapted to be mounted on the side bar of an automobile; a piston rod, having a piston thereon, disposed in said cylinder and extending through the head thereof; an open spring disposed around said piston rod within said cylinder adapted to hold said piston down; bracket adapted to be mounted on the fenders of an automobile; a horizontally disposed tube mounted in said brackets; head lights mounted on said tube; an arm mounted on said tube and connected to said piston rod and adapted to be actuated thereby; an air reservoir adapted to be mounted on an automobile; a pipe leading from said reservoir, a three way cock in communication with said cylinder and connected to said pipe; said cock having an operating lever; a main lever adapted to be mounted on a side bar of an automobile; a bar connecting said levers; a quadrant and a bracket adapted to be mounted on the steering wheel column of an automobile; a rod having a lever at the top and an arm at the bottom, mounted in said quadrant and bracket; a link connecting said arm and said main lever; for the purposes set forth.

2. In a device of the class described the combination of a vertically disposed cylinder adapted to be mounted on the side bar of an automobile; a piston rod, having a piston thereon, disposed in said cylinder and extending through the head thereof; a yoke on the head of said cylinder; collars on said piston rod within said yoke; an open spring disposed around said piston rod within said cylinder adapted to hold said piston down; brackets adapted to be mounted on the fenders of an automobile; a horizontally disposed tube mounted in said brackets; head lights mounted on said tube and connected to said piston rod and adapted to be actuated thereby; an air reservoir adapted to be mounted on an automobile; a pipe leading from said reservoir, a three way cock in communication with said cylinder and connected to said pipe; said cock having an operating lever; a main lever adapted to be mounted on a side bar of an automobile; a bar connecting said levers; a quadrant and a bracket adapted to be mounted on the steering wheel column of an automobile; a rod having a lever at the top and an arm at the bottom, mounted in said quadrant and bracket; a link connecting said arm and said main lever; for the purposes set forth.

3. In a device of the class described the combination of a vertically disposed cylinder adapted to be mounted on the side bar of an automobile; a piston rod, having a piston thereon, disposed in said cylinder and extending through the head thereof; an open spring disposed around said piston rod within said cylinder adapted to hold said piston down; brackets, each having an outer and an inner ball race with balls therein, adapted to be mounted on the fender of an automobile; a horizontally disposed tube, having threads therein; two threaded plugs each having a cone shoulder and a threaded extension, screwed into said tubes, and mounted in said brackets, the cone shoulders being disposed against the balls in one ball race of each bracket; a cone screwed on the threaded extension of each plug and against the balls in the outer ball race; a lock nut screwed against each outer cone; a lock nut screwed on said plug against said tube; head lights mounted on said tube; an arm mounted on said tube and connected to said piston rod and adapted to be actuated thereby; an air reservoir adapted to be mounted on an automobile; a pipe leading from said reservoir, a three way cock in communication with said cylinder and connected to said pipe; said cock having an operating lever; a main lever adapted to be mounted on a side bar of an automobile; a bar connecting said levers; a quadrant and a bracket adapted to be mounted on the steering wheel column of an automobile; a rod having a lever at the top and an arm at the bottom, mounted in said quadrant and bracket; a link connecting said arm and said main lever; for the purposes set forth.

WILLIAM L. THAETE.
FRED E. MEFFORD.